Nov. 15, 1955 W. C. DUNLAP, JR 2,724,077
ASYMMETRICALLY CONDUCTIVE DEVICE
Filed Oct. 19, 1949
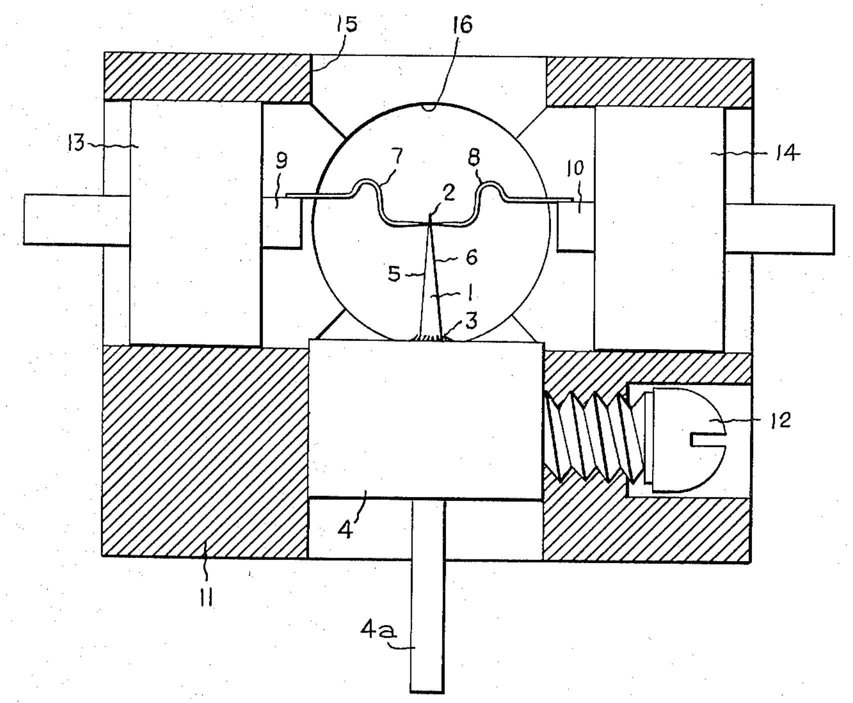
Inventor:
William Crawford Dunlap, Jr.,
by Paul A. Frank
His Attorney.

United States Patent Office 2,724,077
Patented Nov. 15, 1955

2,724,077

ASYMMETRICALLY CONDUCTIVE DEVICE

William Crawford Dunlap, Jr., Schenectady, N. Y., assignor to General Electric Company, a corporation of New York Application October 19, 1949, Serial No. 122,244
1 Claim. (Cl. 317—235)

My invention relates to asymmetrical conductive devices and more particularly to devices employing the rectifying action between a first electrode making a point or other small area contact and a semi-conductor wherein this action is controlled or modified by an additional point or other small area contacting conductor. Certain devices of this nature have become known as transistors.

An object of the invention is to provide an asymmetrically conductive device comprising a semi-conductor member and two cooperating contact members.

A further object is to provide an improved construction for amplifying devices wherein the flow of current between a semi-conductor member and a member in contact therewith is controlled by the potential of a second auxiliary contact or exciter electrode.

Rectifiers of the contact type employing a semi-conductor are well known. Such rectifiers consist of a slab or slice of a semi-conductor material, such as germanium or silicon, in contact at its opposed faces with conductors, one of which makes substantially point or small area contact, while the other (or return conductor) is in contact over a relatively large area, the rectifying action of the device taking place between the two conductors.

It has recently become known that the rectifying action of such a slab of semi-conductor material can be controlled by means of an auxiliary conductor (hereinafter termed the exciter electrode) making substantially point or line contact with another small area of the slab and spaced a small distance, of the order of five thousandths of an inch, from the substantially punctiform contact of the previously mentioned small area conductor. If a variable voltage is applied between the exciter electrode and the return conductor, a variable current can be caused to flow in a circuit including this small area contacting conductor (hereinafter termed the collector electrode) and can be made to develop a voltage and current of similar wave worm to that applied to the exciter electrode but of greater value, i. e., an amplifying effect can be obtained. Difficulty, however, is experienced in obtaining the small and critical spacing between the exciter and collector electrodes and in maintaining stable operation of such a device.

Because of the minute size of known devices of this nature and because of the delicate adjustments of the contact members which are required in order to make the devices operative, the devices have been difficult to manufacture and involve difficult contact member adjustment problems.

It is therefore a further object of the invention to provide an improved asymmetrically conductive device having a structure which is relatively simple and economical to manufacture and which may be quickly and easily adjusted to give satisfactory transistor amplifying operation.

According to the present invention the exciter and collector electrodes are disposed in contact with opposite faces of a wedge of semi-conductor material, input and output circuits being associated with the exciter and collector electrodes, respectively, and preferably including a common return conductor arranged at the base of the wedge remote from the points of contact of the exciter and collector electrodes.

The novel features which I believe to be characteristic of my invention are set forth with particularity in the appended claim. My invention itself, however, both as to its organization and method of operation, together with further objects and advantages thereof may best be understood by reference to the following description taken in connection with the accompanying drawing in which the single figure illustrates, partially in section, an asymmetrically conductive device in accord with the invention.

Referring now to the drawing, a device according to the invention may comprise a wedge 1 of a semi-conductor material, such as germanium, with a pointed edge 2 extending upwardly. Wedge 1 is soldered at the base at 3 with a tin solder to a supporting button 4 which is preferably of a good conductor material such as silver. The dimensions of wedge 1 may preferably be as follows: The wedge thickness at edge 2 may be of the order of one or two thousandths of an inch, and at the base 3, approximately 0.02 inch. The height of the wedge from the base 3 to the edge 2 may bo 0.11 inch and the width of the faces 5 and 6 of the wedge (represented only by the wedge profile lines in the drawing) may also be 0.11 inch. These dimensions are not critical except that the thickness at edge 2 should not greatly exceed the dimension given. Affixed to the bottom of wedge supporting button 4 is a conductive lead *4a* for exterior electrical connection to the transistor.

Exciter and collector electrodes are provided in the form of pointed or sharpened wires 7 and 8 which respectively engage faces 5 and 6 of wedge 1. These electrodes may be of tungsten, platinum-iridium alloy or nickel, but the presently preferred material is phosphor bronze. Electrodes 7 and 8 are spot welded to electrically conductive supporting members 9 and 10 which may preferably be nickel.

The entire device is housed within a cartridge 11 which may be of a suitable material such as brass. Wedge supporting button 4 is firmly positioned within an opening in cartridge 11 by means of a set screw 12, and members 9 and 10 are also appropriately positioned in the cartridge by means of non-conductive beads 13 and 14 which are press-fitted into appropriate openings in the casing 11. Beads 13 and 14 may be of a superpolyamide material such as nylon.

Openings at 15 and 16 may be provided in cartridge 11 to facilitate adjustment of the electrodes 7 and 8, and when such adjustment has been accomplished, these openings may be closed by suitable covers, not shown. The interior of the cartridge may first be filled through these openings with an insulating wax to maintain the electrodes in the adjusted positions.

Since the spacing between the electrodes is very critical in obtaining efficient operation of a transistor, the above structure has peculiar advantages in the adjustment of the electrodes 7 and 8. Since the wedge 1 of semi-conductor material has a relatively gradually increasing thickness from top to bottom, as indicated by dimensions given above, a relatively large vertical movement of the points of electrodes 7 or 8 in a vertical direction gives a relatively gradual increase or decrease of electrode spacing. This fine adjustment is available with the structure described because the influence of the exciter electrode on the operation of the collector electrode is apparently exerted through the wedge of semi-conductor material by an action analogous to that in the slab type of transistor described in a co-pending patent application, Serial Number 65,305, filed on December 15, 1948, by Thomas H. Kinman and assigned to the same assignee as the present invention. The influence of one electrode upon the other is apparently not exerted across the surface of the semi-conductor material.

An appropriate and useful method for the assembly and adjustment of the asymmetrically conductive device of this invention is as follows. The wedge of germanium 1 with supporting button 4 is inserted within the cartridge 11 to the position shown in the drawing and tightened in place by means of set screw 12. Electrode 7, together with the associated supporting structure including member 9 and non-conductive bead 13, is then assembled into the cartridge 11 by press-fitting the bead 13 into the cartridge opening until the point of electrode 7 touches wedge 1 at face 5 near the wedge point 2. Slight lateral adjustment of the electrode point may be necessary to assure contact with the proper area of the wedge. A slight amount of additional inward movement is then provided in order to stress electrode 7 to assure an adequate force at the electrode point to maintain the electrode adjustment. Electrode 8, together with member 10 and bead 14, is then assembled within the cartridge to touch face 6 in a similar manner. The point of electrode 8 is then adjusted by a suitable tool, or manually without the aid of tools while observed through a suitable optical magnifier, until the points of electrodes 7 and 8 are aligned directly opposite one another. This may be accomplished by successive adjusting steps while viewing the electrodes in profile in one direction, as through cartridge opening 16, and then while viewing in a direction perpendicular to the first direction, as through cartridge opening 15. The distance between these points may be measured before, during, or after this adjustment. Further adjustment may be made if necessary to increase or decrease the electrode spacing, as suggested above, by moving the electrode points up or down the faces of the germanium wedge 1. Improper spacing may also be discovered by means of tests of the electrical characteristics of the device.

Since the device shown has a symmetrical structure, the electrodes 7 and 8 may be interchangeably used as exciter and collector electrodes. Assuming for the moment that electrode 7 is to be used as the exciter, and electrode 8 as the collector, and wedge supporting button 4 is to be designated as the return conductor, input voltage variations to be reproduced may be applied between the exciter electrode and the return conductor, a bias being applied with such polarity as to render the exciter electrode slightly positive with respect to the return conductor.

The output circuit of the device is made between the collector electrode and the return conductor and may include a battery and a load impedance in series, the battery being so polarized as to apply a relatively large negative voltage to the collector electrode with respect to the return conductor. The output voltage variations appear across the impedance in the output circuit, and may be utilized directly, or if necessary with further amplification. Such further amplification may be obtained by a further current control device of the character above described or by means of a thermionic valve or valves.

Alternatively, the device may be used as an oscillator by suitable coupling between input and output circuits.

Circuits utilizing the device are not shown herein, since many well known types of circuits will be found useful by those skilled in the art.

The above device provides a relatively simple structure which may be easily manufactured and assembled and which is particularly characterized by ease of adjustment of the electrodes. The electrodes may be easily applied and adjusted relatively independently of the dimensions of the semi-conductor material. The wedge or crystal of semi-conductor material may, therefore, be manufactured with relatively wide dimensional tolerances without detracting appreciably from transistor operation efficiency, since variations in the crystal dimensions may be compensated for at the time of adjustment of the electrodes. This is particularly important when germanium is used, for this material is very hard and brittle and difficult to machine.

While I have shown only certain preferred embodiments of my invention by way of illustration, many modifications will occur to those skilled in the art and I therefore wish to have it understood that I intend, in the appended claim to cover all such modifications as fall within the true spirit and scope of my invention.

What I claim as new and desire to secure by Letters Patent of the United States is:

In a current control device comprising a wedge of germanium having two opposed major faces, a pointed exciter electrode and a pointed collector electrode, the method of assembly and adjustment comprising the steps of positioning the point of one of said electrodes against one major face of said wedge near the pointed edge thereof, positioning the other electrode against the other major face near the edge thereof and successively adjusting the point of the second electrode into horizontal and vertical alignment with the point of the first electrode, while simultaneously observing both electrodes from a position of observation immediately above the apex of the wedge.

References Cited in the file of this patent

UNITED STATES PATENTS

| | | |
|---|---|---|
| 2,560,579 | Kock et al. | July 17, 1951 |
| 2,618,691 | Bethge et al. | Nov. 18, 1952 |
| 2,691,750 | Shive | Oct. 12, 1954 |

OTHER REFERENCES

Shive: Physical Review, February 15, 1949, pages 689, 690.